April 6, 1926.
C. C. TOMKINSON
1,579,418
PIPE HANGER
Filed Oct. 20, 1922
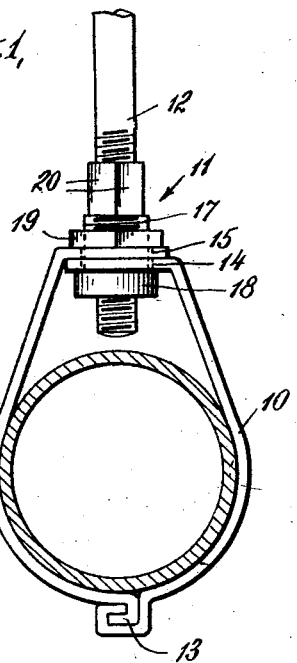
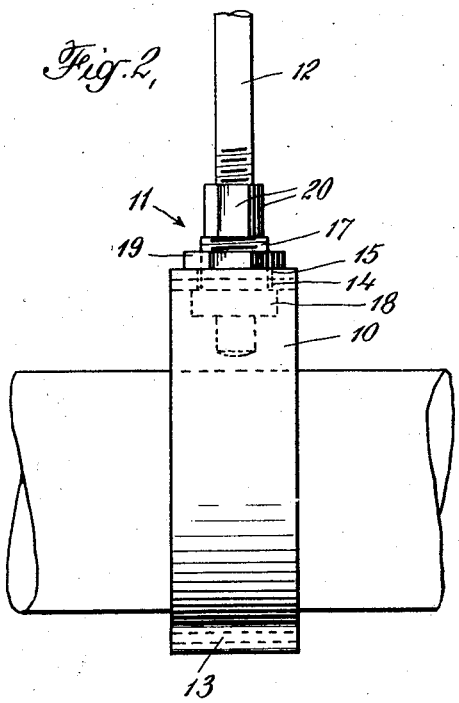
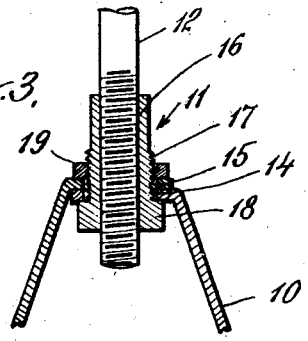
INVENTOR
Charles C. Tomkinson
BY
ATTORNEY Patented Apr. 6, 1926.

1,579,418

UNITED STATES PATENT OFFICE.

CHARLES C. TOMKINSON, OF PLAINFIELD, NEW JERSEY, ASSIGNOR TO J. EDWARD OGDEN, OF MOUNTAINVILLE, NEW YORK.

PIPE HANGER.

Application filed October 20, 1922. Serial No. 595,728.

*To all whom it may concern:*

Be it known that I, CHARLES C. TOMKINSON, a citizen of the United States, and a resident of Plainfield, county of Union, and State of New Jersey, have invented certain new and useful Improvements in Pipe Hangers, of which the following is a specification.

This invention relates to supports and particularly to supports of the type known as pipe hangers used for suspending overhead pipe lines.

One of the objects of the invention is to provide a pipe hanger so constructed and arranged as to be adjustable toward or from the ceiling, wall or other fixed support to which it is attached after the hanger has been assembled and mounted in position.

Another object of the invention is to provide a hanger so constructed that the parts will be securely held in position after they have been adjusted.

Another object of the invention is to provide a hanger that can be economically manufactured and easily installed.

Further objects of the invention will appear from the following description taken in connection with the drawings which form a part of this application and in which, Fig. 1 is an end elevational view of the hanger constructed in accordance with the invention.

Fig. 2 is a side elevational view of the structure shown in Fig. 1, and

Fig. 3 is a sectional elevation of the hanger showing the means for connecting the loop or carrier to the rod or bolt upon which it is mounted.

The hanger briefly described comprises a looped carrier 10, a sleeve 11 adapted to support the carrier and the sleeve in turn is adjustably mounted on a rod or bolt 12 secured in any suitable manner to the wall, ceiling or other fixed supporting structure from which the pipe is to be suspended. The sleeve 11 is adjustably mounted on the rod and means is provided for locking the sleeve in any desired position of adjustment and for securing the sleeve to the carrier.

In the embodiment of the invention illustrated the carrier comprises a pair of straps connected together at their lower ends by an interlocking joint 13 and having formed in their upper ends openings 14 and 15 adapted to register when the straps are assembled as shown in Figs. 1 and 3. If desired, however, a single strap may be used.

The sleeve 11 is threaded internally as shown at 16 and externally as shown at 17 and is provided at its lower end with a head 18 for limiting relative movement between the sleeve and carrier in one direction. As clearly illustrated in Fig. 3 the sleeve is loosely mounted in the openings 14 and 15 and a lock nut 19 is mounted on the external threaded portion of the sleeve for fixedly securing the sleeve to the carrier ends. The upper end portion of the sleeve is illustrated as having a plurality of flat sides 20 or as hexagonal and this portion may be engaged by a wrench or other tool to prevent rotation of the sleeve when the lock nut 19 is being adjusted or to rotate the sleeve when the sleeve is being adjusted on the rod 12.

The pipe hanger is used in the following manner. First, the carrier sections are assembled around a pipe or other object to be supported and the sleeve 11 is passed through the openings 14 and 15 in the carrier ends. Before tightening the lock nut 19 the sleeve is rotated to adjust the carrier to the proper position on the bolt 12 and thereafter the lock nut 19 is tightened thereby firmly securing the parts together.

Although one specific embodiment of the invention has been particularly described and illustrated it will be understood that the invention is capable of modification and that changes in the construction and in the arrangement of the various cooperating parts may be made without departing from the spirit or scope of the invention as expressed in the following claim.

What I claim is:—

A pipe hanger comprising a looped carrier having overlapping ends provided with aligned openings, a headed sleeve loosely extending through the openings in the carrier ends and having internal and external threads, a hanger bolt threaded into the sleeve and a lock nut threaded on the outside of the sleeve and engageable with the upper carrier end.

In witness whereof, I have hereunto set my hand this 19th day of October, 1922.

CHARLES C. TOMKINSON.